US00RE43305E

(19) United States
(12) Reissued Patent
Boehnke

(10) Patent Number: US RE43,305 E
(45) Date of Reissued Patent: *Apr. 10, 2012

(54) TRANSMISSION SYSTEM FOR OFDM-SIGNALS WITH OPTIMIZED SYNCHRONIZATION

(75) Inventor: Ralf Boehnke, Esslingen (DE)

(73) Assignee: SONY DEUTSCHLAND GmbH, Cologne (DE)

( * ) Notice: This patent is subject to a terminal disclaimer.

(21) Appl. No.: 11/416,477

(22) Filed: May 3, 2006

Related U.S. Patent Documents

Reissue of:

(64) Patent No.: 6,731,594
Issued: May 4, 2004
Appl. No.: 09/146,734
Filed: Sep. 3, 1998

(30) Foreign Application Priority Data

Sep. 4, 1997 (EM) ..... 97115345

(51) Int. Cl.
*H04J 11/00* (2006.01)

(52) U.S. Cl. ..... 370/208; 370/203

(58) Field of Classification Search ..... None
See application file for complete search history.

(56) References Cited

U.S. PATENT DOCUMENTS 5,425,050 A * 6/1995 Schreiber et al. ..... 375/141
5,506,836 A 4/1996 Ikeda et al.
5,559,833 A 9/1996 Hayet
5,675,572 A 10/1997 Hidejima et al.
5,694,389 A 12/1997 Seki et al.
5,732,068 A * 3/1998 Takahashi et al. ..... 370/206
5,774,450 A * 6/1998 Harada et al. ..... 370/206
5,787,123 A * 7/1998 Okada et al. ..... 375/324
5,841,813 A 11/1998 Van Nee (Continued)

FOREIGN PATENT DOCUMENTS

DE 195 20 353 A1 12/1996

(Continued)

OTHER PUBLICATIONS

Cuthbert Nyack; "Fourier Series Symmetries"; XP-002347385, Sep. 29, 2005, pp. 1-2.

(Continued)

*Primary Examiner* — Phirin Sam
(74) *Attorney, Agent, or Firm* — Oblon, Spivak, McClelland, Maier & Neustadt, L.L.P.

(57) ABSTRACT

The present invention relates to a transmission apparatus for transmitting OFDM-signals comprising modulation means 4 for modulating said signals onto a plurality of subcarriers using a OFDM-modulation method, transformation means 5 for transforming said modulated signals into the time domain, and transmission means for transmitting said signals, whereby in said modulation means every M-th subcarrier is modulated, wherein M is an integer and M≧2. The present invention also relates to a corresponding transmission method for transmitting OFDM-signals.

Figure 1:
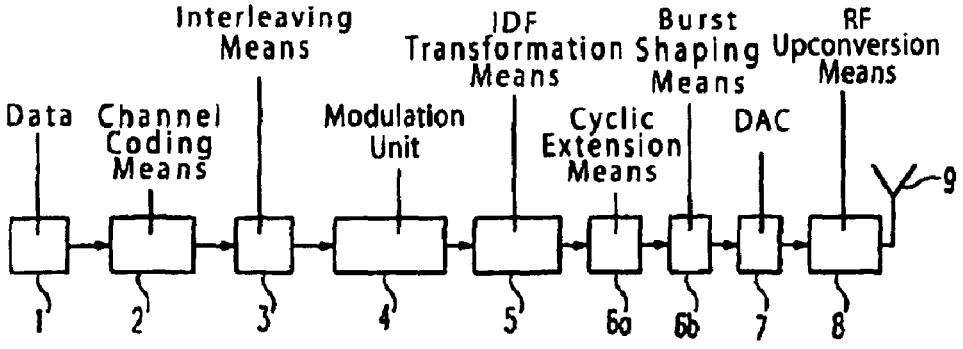

The present invention further relates to a receiving apparatus for receiving OFDM-signals comprising M identical or respectively mirrored wave forms within one OFDM-time-burst, wherein M is an integer and M≧2, comprising receiving means for receiving said OFDM-signals, correlation means 22 for correlating said wave forms to obtain time synchronization, transformation means 23 for transforming said signals into the frequency domain and demodulation means 24 for demodulating said signals. The present invention also relates to a corresponding receiving method for receiving OFDM-signals. The present invention provides a much better time and frequency synchronisation performance based on correlation techniques than conventional OFDM-systems.

46 Claims, 5 Drawing Sheets

U.S. PATENT DOCUMENTS

| | | | | | |
|---|---|---|---|---|---|
| 5,867,478 | A | | 2/1999 | Baum et al. | |
| 5,903,546 | A | * | 5/1999 | Ikeda et al. | 370/232 |
| 5,909,436 | A | * | 6/1999 | Engstrom et al. | 370/343 |
| 5,946,292 | A | | 8/1999 | Tsujishita et al. | |
| 5,949,796 | A | * | 9/1999 | Kumar | 370/529 |
| 5,953,311 | A | | 9/1999 | Davies et al. | |
| 5,966,401 | A | | 10/1999 | Kumar | |
| 6,009,073 | A | * | 12/1999 | Kaneko | 370/203 |
| 6,038,450 | A | | 3/2000 | Brink et al. | |
| 6,125,150 | A | | 9/2000 | Wesel et al. | |
| 6,148,045 | A | * | 11/2000 | Taura et al. | 375/344 |
| 6,175,551 | B1 | * | 1/2001 | Awater et al. | 370/210 |
| 6,456,668 | B1 | * | 9/2002 | MacLellan et al. | 375/283 |
| 7,145,971 | B2 | * | 12/2006 | Raleigh et al. | 375/347 |
| 7,542,729 | B2 | * | 6/2009 | Oshima | 455/73 |

FOREIGN PATENT DOCUMENTS

| | | | |
|---|---|---|---|
| EP | 0 613 267 | A2 | 8/1994 |
| EP | 0 653 859 | A1 | 5/1995 |
| EP | 0 730 357 | A2 | 9/1996 |
| EP | 0 730 757 | | 9/1996 |

OTHER PUBLICATIONS

Timothy M. Schmidl, et al., Low-Overhead, Low-Complexity [Burst] Synchronization for OFDM, Jun. 23, 1996, pp. 1301-1306.

* cited by examiner

TRANSMISSION SYSTEM FOR OFDM-SIGNALS WITH OPTIMIZED SYNCHRONIZATION

Matter enclosed in heavy brackets [ ] appears in the original patent but forms no part of this reissue specification; matter printed in italics indicates the additions made by reissue.

The present invention relates to a transmission method according to the preamble of claim 1, to a transmission apparatus according to the preamble of claim 5, a receiving method according to claim 9, a receiving apparatus according to claim 13 and a transmission system according to claim 17.

In a conventional OFDM-system signals or information contained in signals are modulated onto subcarriers in the frequency domain. The spacing between the subcarriers is equal and the subcarriers are arranged orthogonally in the frequency domain. The respectively applied modulation scheme varies for example the magnitude and phase of the described subcarriers. A conventional transmission apparatus for transmitting OFDM-signals therefore comprises as basic elements modulation means for modulating said signal onto a plurality of subcarriers using a OFDM-modulation method, transformation means for transforming said modulated signals into the time domain, and transmission means for transmitting said signals. In a conventional OFDM-system, a transmission means for OFDM-signals extends a time domain signal after a transformation into the time domain (e. g. by an inverse discrete Fourier transformation) by some guard samples to overcome multipath effects during the transmission. Usually the extension of the time domain signal is done by a cyclic extension, wherein a part of the wave form is repeated. A corresponding OFDM-signal receiving apparatus can perform correlation utilizing the two identical wave form parts to obtain information on the timing of the OFDM-time bursts for further processing. Usually this timing information is used to optimally place the discrete Fourier transformation window in the receiving apparatus to be able to transform the modulated subcarriers into the frequency domain and to demodulate them thereafter.

To provide an efficient transmission system, the guard time or cyclic extension has to be as short as possible, namely slightly larger than the longest expected transmission path duration, which can result in poor cyclic extension based correlation properties in a receiving apparatus if the cyclic extension is very short (e. g. only a few samples). In this case, in known OFDM-systems synchronization bursts are used, which contain only synchronization information. This reduces the transmission efficiency, since a special synchronization burst designed in the time domain does not contain information (in the frequency/subcarrier domain) to be transmitted.

The object of the present invention is therefore to provide a transmission method according to the preamble of claim 1, a transmission apparatus according to the preamble of claim 5, a receiving method according to claim 9, and a receiving apparatus according to claim 13, which provide optimized correlation possibilities.

This object is achieved by a transmission method according to claim 1, a transmission apparatus according to claim 5, a receiving method according to claim 9, and a receiving apparatus according to claim 13. Also, this object is achieved by a transmission system according to claim 17.

The transmission method for transmitting OFDM-signals according to the present invention comprises the steps of modulating said signals onto a plurality of subcarriers using a OFDM-modulation method, transforming said modulated signals into the time domain, and transmitting said signals, characterized in that in said modulating step every M-th subcarrier is modulated with a signal, wherein M is an integer and $M \geqq 2$.

The transmission apparatus for transmitting OFDM-signals according to the present invention comprises modulation means for modulating said signals onto a plurality of subcarriers using a OFDM-modulation method, transformation means for transforming said modulated signal into the time domain, and transmission means for transmitting said signals, characterized in that in said modulation means every M-th subcarrier is modulated, wherein M is an integer and $M \geqq 2$.

The receiving method according to the present invention is adapted for receiving OFDM-signals comprising M identical or respectively mirrored wave forms within one OFDM-timeburst, wherein M is an integer and $M \geqq 2$, and comprises the steps of receiving said OFDM-signals, correlating said wave forms to obtain time synchronization, transforming said signals into the frequency domain, and demodulating said signals.

The receiving apparatus according to the present invention is adapted for receiving OFDM-signal comprising M identical or respectively mirrored wave forms within one OFDM-timeburst, wherein M is an integer and $M \geqq 2$, and comprises receiving means for receiving said OFDM-signals, correlation means for correlating said wave forms to obtain time synchronization, transformation means for transforming said signals into the frequency domain, and demodulation means for demodulating said signals.

Advantageous features of the present invention are defined in the respective subclaims.

The modulation of every M-th subcarrier according to the present invention, after the succeeding transformation of the signals into the time domain, e. g. by an inverse discrete Fourier transformation, results in a signal containing M identical or respectively mirrored wave forms, whereby the total duration of the OFDM-timeburst is still $1/f_0$ ($f_0$ is the subcarrier spacing). With M identical wave forms within one OFDM-timeburst, the corresponding receiving apparatus can perform an optimized correlation in the time domain, e. g. to obtain time and frequency information and synchronization, respectively. Further on, information to be transmitted can be modulated onto every M-th subcarrier and the transmission of a special time-domain synchronization time burst usually not containing useful information in the frequency-subcarrier domain is not necessary.

The present invention can be applied to every transmission system based on a multicarrier OFDM-modulation method, e. g. wireless and wired transmission systems. Possible and advantageous applications of the present invention in a wireless transmission system are for example the RACH (Random Access Channel), the BCCH (Broadcast Control Channel), and the IACH (Initial Acquisition Channel). Generally, the present invention is especially effective in scenarios where conventional algorithms to improve correlation based time synchronization, e. g. averaging over multiple time bursts is not possible. The present invention can be applied to any OFDM-system, particularly, when a robust time synchronization for further signal processing, e. g. discrete Fourier transformation, is required.

Advantageously, in said modulation means the not modulated subcarriers are set to zero. Further advantageously, only subcarriers with even indices are modulated. If only subcarriers with even indices are modulated (e. g. M=2), a full (complex) time domain signal consisting of two equal wave forms is obtained after the transformation into the time domain (e. g. by an inverse discrete Fourier transformation). If, on the other hand, only subcarriers with odd indices are modulated (e. g. M=2), a full (complex) time domain signal after the transformation into the time domain is obtained, which contains two respectively mirrored wave forms. In this case, the two wave forms are mirrored so that the correlation result is negative and an additional absolute value unit (or inverter) is necessary in the receiving apparatus to achieve a positive correlation result and a correct frequency offset.

Advantageously, said modulation means comprises means for generating integer values from 0 to L−1, wherein L is the number of available subcarriers, whereby said modulation means modulates every M-th signal onto said subcarriers on the basis of said integer values.

Advantageously, in the correlation means of the receiving apparatus according to the present invention, the identical or respectively mirrored wave forms are correlated on the basis of a delay value L1=S/M and averaged over L2≦S/M samples, whereby S is the total number of samples in one OFDM-timeburst.

It is further advantageous in the receiving apparatus according to the present invention to provide a peak detection means after said correlation means for providing time synchronization for the transformation of said signals into the frequency domain. It is further advantageous to provide a frequency offset detection means after said correlation means for providing frequency synchronization for the transformation of the signals into the frequency domain.

The transmission system for transmitting OFDM-signals according to the present invention comprises a transmission apparatus according to the present invention and a receiving apparatus according to the present invention. This transmission system can be based on a wireless or wired transmission of signals.

Figure 2:
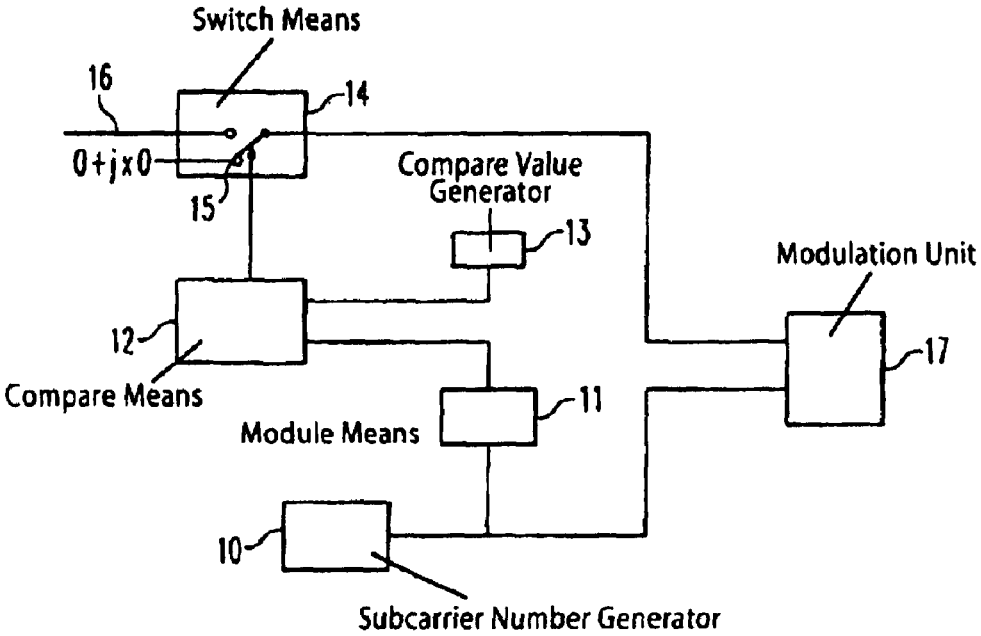
Figure 3:
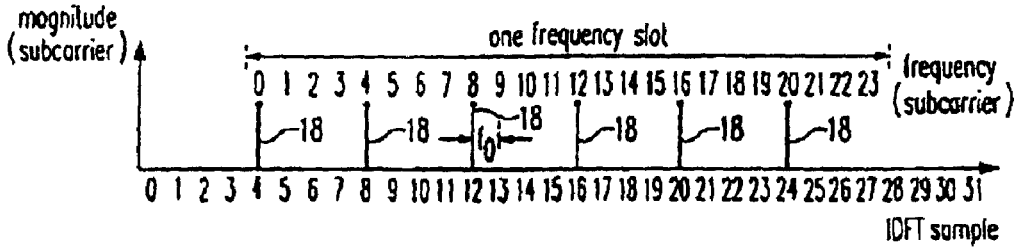
Figure 4:
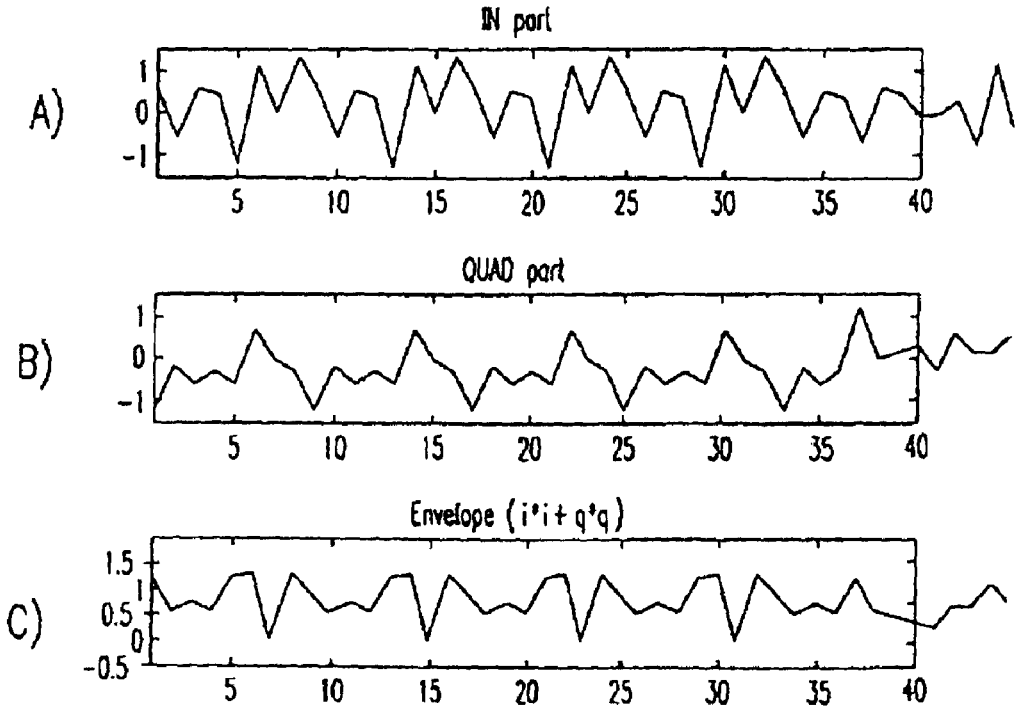
Figure 5:
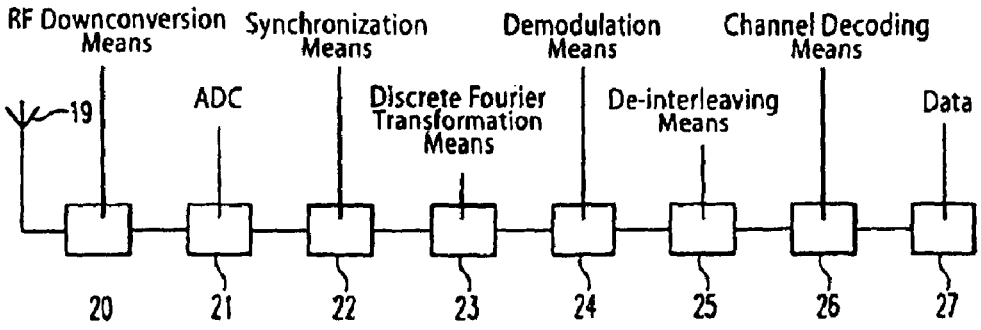
Figure 6:
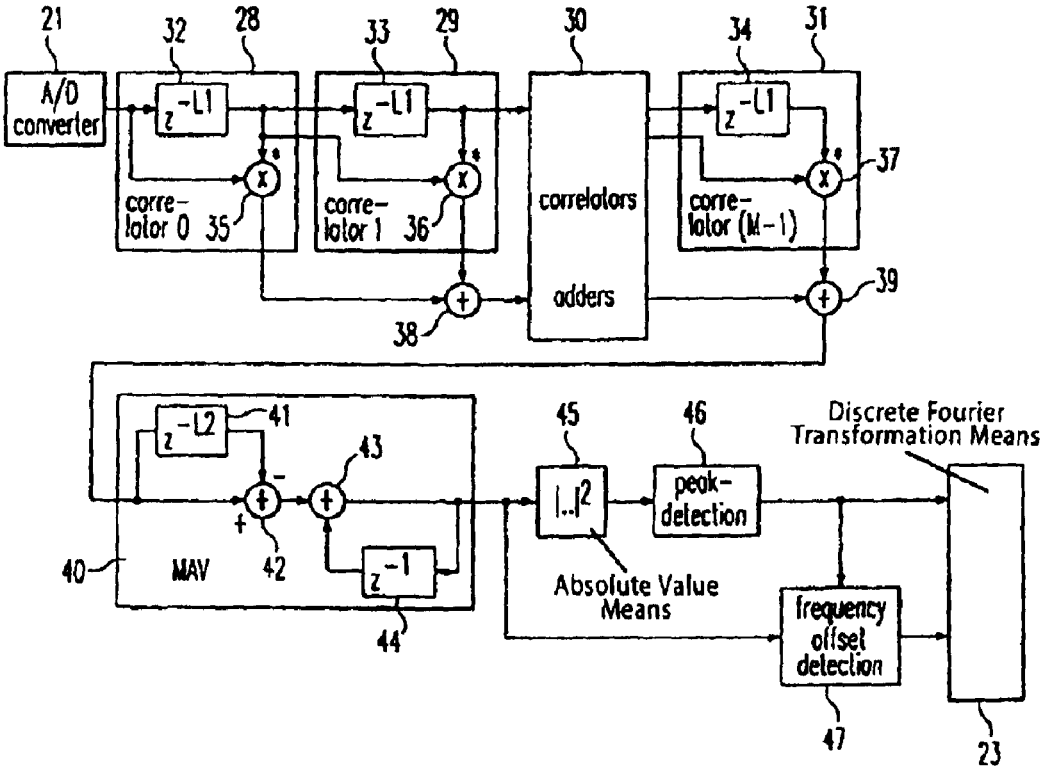
Figure 7:
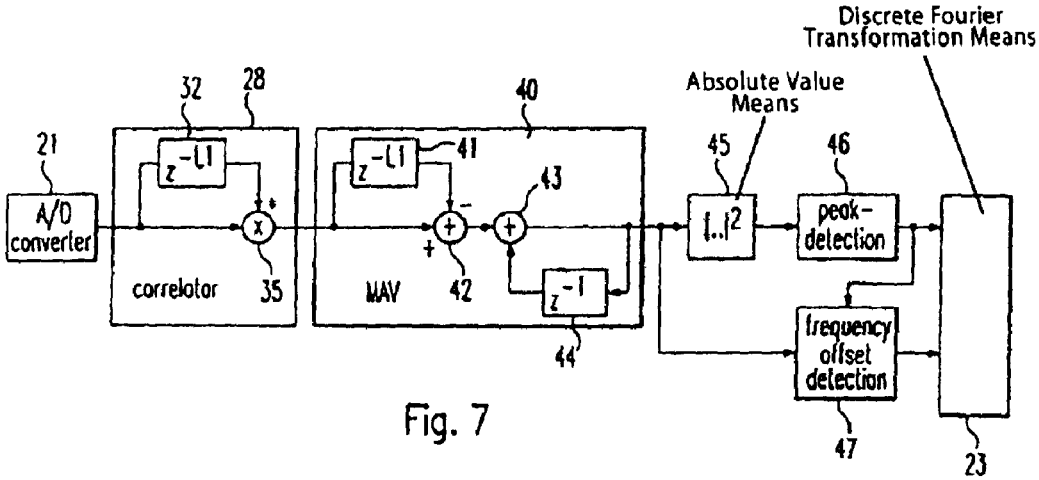
Figure 8:
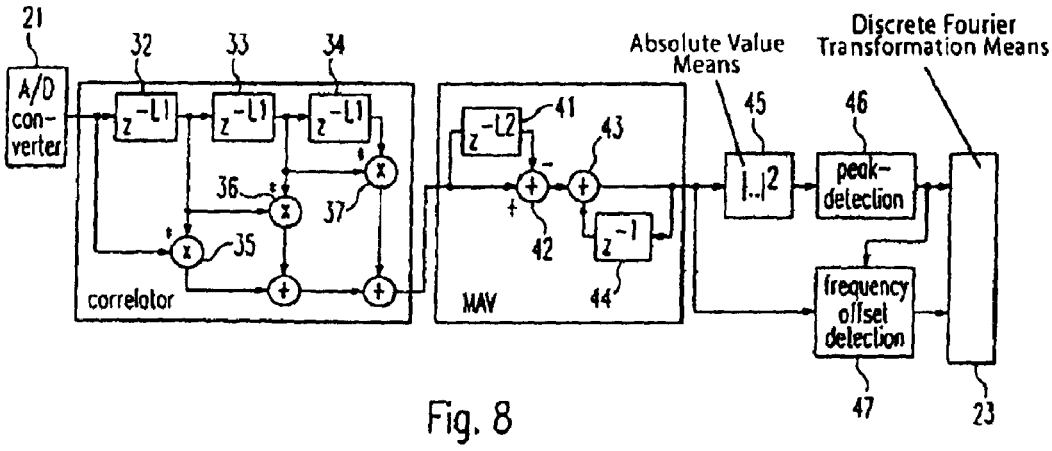
Figure 9:
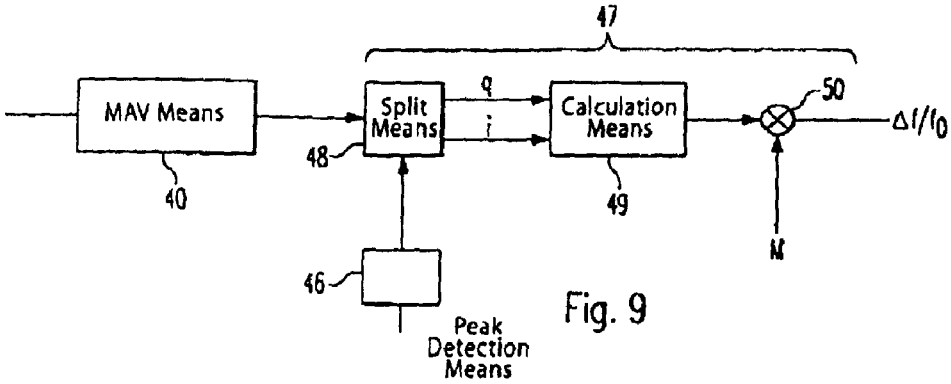
Figure 10:
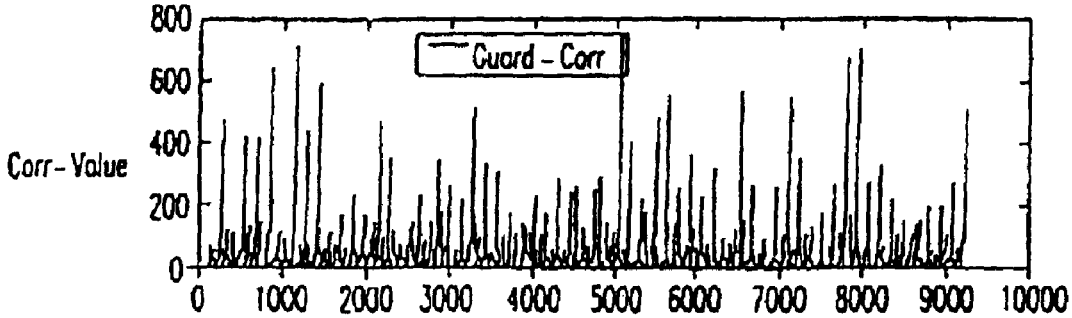
Figure 11:
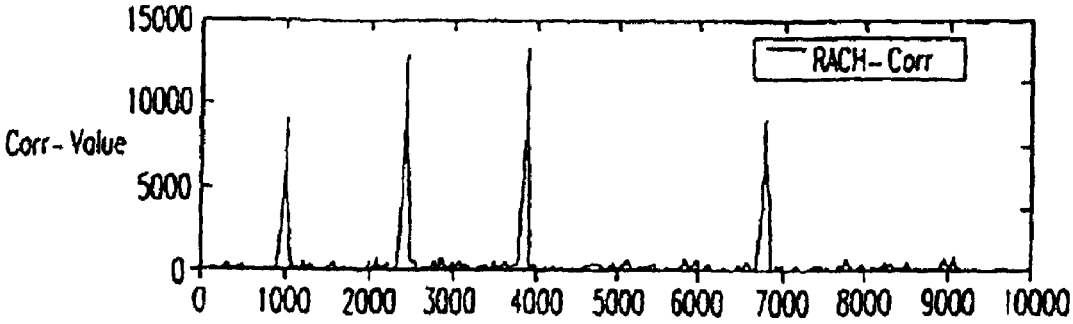

The present invention is explained in detail by means of preferred embodiments relating to the enclosed drawings, in which FIG. 1 shows an-embodiment of the transmission apparatus according to the present invention, FIG. 2 shows the modulation unit of the transmission apparatus shown in FIG. 1 in more detail, FIG. 3 shows an example of modulating every 4-th subcarrier with a signal in the frequency domain, FIG. 4 shows an example for a signal comprising four identical wave forms in the time domain, FIG. 5 shows an embodiment of a receiving apparatus according to the present invention, FIG. 6 shows the time/frequency synchronization means of the receiving apparatus shown in FIG. 5 in more detail and in a general form, FIG. 7 shows the time/frequency synchronization means of the receiving apparatus shown in FIG. 5 for a signal comprising two identical wave forms, FIG. 8 shows the time/frequency synchronization means of the receiving apparatus shown in FIG. 5 for a signal comprising four identical wave forms, FIG. 9 shows the frequency offset detection means in more detail, FIG. 10 shows a frequency spectrum for a conventional correlation performed on the basis of a cyclic extension of a time burst, and FIG. 11 shows a frequency spectrum for a correlation according to the present invention for a random access channel.

FIG. 1 shows an embodiment of a transmission apparatus according to the present invention. In the transmission apparatus shown in FIG. 1, data 1 are channel coded in a channel coding means 2 and interleaved in an interleaving means 3. In a modulation unit 4, the signals carrying the data to be transmitted are modulated with an OFDM-modulation method. An OFDM-system is a multicarrier system with a plurality of subcarriers. In the modulation unit 4, the signals carrying the information to be transmitted are modulated on every M-th subcarrier, wherein M is an integer and M≧2. The modulated signals, for example APM-signals, amplitude-phase-modulated signals, are transformed into the time domain in an inverse discrete Fourier transformation means 5. After the transformation into the time domain, the transformed signals are provided with a cyclic extension in a cyclic extension means 6a and then shaped in a burst shaping means 6b. In the cyclic extension means 6a, the OFDM-time bursts are provided with a guard time (=cyclic extension of the signal) to mitigate multipath effects during transmission. This cyclic extension serves also to provide correlation (to achieve time and frequency synchronisation) in a corresponding receiving apparatus. The cyclic extension consists in a part of the signal being added to the end of the signal, so that the receiving apparatus can conduct calculations on the basis of the doubled signal parts to provide correlation. The burst shaping means 6b does not have to be provided in the transmission apparatus according to the present invention, since the described correlation method (to achieve time and frequency synchronisation) is based on the cyclic extension only. The provision of the burst shaping means 6b, however, improves the transmission spectrum (reduced out of band spurious emission).

After the burst shaping means 6b, or, if the burst shaping means 6b is not provided, after the cyclic extension means 6a, the signals are digital/analog-converted in a D/A-converter 7 and then RF-upconverted in a RF-upconversion means 8 to be transmitted by an antenna 9.

In FIG. 2, the modulation means 4 of the transmission apparatus shown in FIG. 1 is shown in more detail. The transmission means 4 comprises a subcarrier number generator 10 for generating integer values 0,1 . . . L−1 corresponding to the available subcarrier number L in one frequency slot in the OFDM-system. The integer values generated by the subcarrier number generator 10 are fed to a modulation unit 17. Also, the integer values generated by the subcarrier number generator 10 are fed to a modulo means 11, which generates series of integer values depending on the chosen modulation step of the modulation means 4. If, for example, every 4-th subcarrier is modulated with a signal, so that M=4, the modulo means 11 outputs integer values 0,1,2,3,0,1,2,3,0,1, 2,3, . . . .

The output of the modulo means 11 is fed to a compare means 12, which compares the integer values provided by the modulo means 11 with integer values generated by a compare value generator 13. The compare means 12 gives an "active" signal to a switch means 14, if the inputs from the modulo means 11 and the compare value generator 13 are equal. If, for example in the above example, the compare value generator 13 generates an integer value "1", the compare means 12 outputs an "active" signal every 4-th time an integer value "1" is fed from the modulo means 11 (M=4). Otherwise, the output of the compare means 12 is a "not active" signal. If the switch means 14 obtains an "active" signal from the compare means 12, it connects a line 16 providing signals with data to be modulated with the modulation unit 17. If the switch means 14 obtains an "not active" signal from the compare means 12, it connects a zero terminal 15 with the modulation unit 17. In the above example (M=4), the switch means 14 therefore connects the data line 16 every 4-th time an integer value is generated by the subcarrier number generator 10 with the modulation unit 17. Therefore, every 4-th subcarrier is modulated with signals carrying data in the modulation unit 17. The other subcarriers are not modulated in the modulation unit 17, since the switch means 14 selects the zero terminal 15 at the time these subcarriers are fed to the modulation unit 17. At the zero terminal 15, a "0" value is input (complex: 0=0+j×0) so that the other subcarriers are not modulated.

In FIG. 3, a frequency domain representation for the modulation of every 4-th subcarrier is shown. The horizontal axis shows the number S=32 of the inverse discrete Fourier transformation samples 0 . . . 31 and the vertical axis shows the magnitude of the subcarriers. Also, one frequency slot comprising L=24 (0 . . . 23) available subcarriers is shown wherein each subcarrier is sampled in the inverse discrete Fourier transformation means 5. Each 4-th subcarrier 18 (subcarrier number 0, 4, 8, 12, 16 and 20) is modulated with a signal, wherein the spacing between adjacent subcarriers is $f_0$. The IDFT samples 0 . . . 3 and 28 . . . 31 are unmodulated guard subcarriers (to perform a power-of-2 DFT, here 32-point DFT), and the samples 4 . . . 27 are the used subcarrier samples (here we assumed one frequency slot consists of 24 subcarriers).

FIG. 4 shows the corresponding time domain wave forms for the example shown in FIG. 3, wherein every 4-th subcarrier is modulated. The modulation of every 4-th subcarrier leads to time domain signals containing 4 identical wave forms, since only subcarriers with even indices (compare FIG. 3) have been modulated.

In FIG. 4A, the IN-part (in-phase part), and in FIG. 4B, the QUAD-part (quadrature part) of a wave form signal in the time domain, in which every 4-th subcarrier has been modulated in the frequency domain, is shown. FIG. 4C shows the envelope of the IN-part and the QUAD-part shown in FIG. 4A and FIG. 4B, respectively (envelope=SQRT {IN*IN+QUAD*QUAD}). As can be seen, the wave form signals contain 4 identical wave forms, since in the frequency domain only subcarriers with even indices have been modulated. The modulation of subcarriers with only odd indices leads to wave forms which are slightly different to the wave forms shown in FIG. 4. The modulation of subcarriers with only odd indices leads after the transformation in the time domain to wave form signals with respectively mirrored wave forms. In this case, every second wave form in the time domain signal is mirrored in respect to the correspondingly preceding wave form. If a sample in a first waveform is $x_1$=a+j×b, the corresponding sample in the second waveform is $x_2$=(−a−j×b)=(−1)*(a+j×b).

In FIG. 5, an embodiment of a receiving apparatus according to the present invention is shown. Data transmitted, e. g. from a transmission apparatus as shown in FIG. 1, are received in an antenna 19 and RF-downconverted in a RF-downconversion means 20. Then, the signals are analog to digital converted in an A/D-converter 21 and fed to a time/frequency synchronization means 22. In the time/frequency synchronization means 22, the received signals are correlated and synchronized, so that a proper transformation to the frequency domain in a succeeding discrete Fourier transformation means 23 can be executed. The transformed signals are then demodulated in a demodulation means 24. The demodulated signals are de-interleaved in de-interleaving means 25 and then channel-decoded in a channel-decoding means 26. The channel-decoding means 26 outputs data signals 27 to be further processed.

In FIG. 6, the time/frequency synchronization means 22 of the receiving apparatus shown in FIG. 5 is shown having a general structure. The time-/frequency synchronization means 22 consists generally of a correlation means with one or more correlator parts 28, 29, 30, 31 and a moving average means 40. After the moving average means 40, an absolute value means 45 is provided. After the absolute value means 45, a peak detection means 46 can be provided. The output of the peak detection means 46 and the output of the moving average means 40 can be fed to an also optionally provided frequency offset detection means 47.

The time/frequency synchronization means 22 comprises (M−1) correlator parts. If, for example, every 4-th subcarrier is modulated, the time-/frequency synchronization means 22 comprises 3 correlator parts, as is shown in more detail in FIG. 8.

In FIG. 6, the output of the A/D-converter 21 is fed to a first correlator part 28 comprising a delay means 32 and a multiplier 35. The output of the A/D-converter is fed to the delay means 32, which delays the signal with a factor $z^{-L1}$. The output of the delay means and the output of the A/D-converter 21 are multiplied in the multiplier 35. The output of the delay means 32 is further fed to a delay means 33 and a multiplier 36 of a second correlator part 29. The delay means 33 delays the output of the delay means 32 with a factor $z^{-L1}$. The output of the delay means 33 is multiplied in the multiplier 36 with the output of the delay means 32. The outputs of the multiplier 35 and the multiplier 36 are added in an adder 38. Successive correlator parts and adders are symbolized by a block 30. The (M−1)th correlator part 31 delays the output of the delay means of the preceding correlator part in a delay means 34 by a factor $z^{-L1}$ and multiplies the output of the delay means 34. The output of the delay means 34 is multiplied in a multiplier 37 with the output of the preceding delay means. The output of the multiplier 37 is added in an adder 39 to the output of a preceding adder.

Then, the output of the last adder 39 is fed to the moving average means 40. In the moving average means 49, the incoming signal is delayed in a delay means 41 by a factor $z^{-L2}$. In an adder 42, the output of the delay means 41 is subtracted from the incoming signal. The output of the adder 42 is fed to an adder 43, which is backfed with its own output delayed by factor $z^{-1}$ in a delay means 44. The moving average means thus performs the function $$(1 - z^{-L2})/(1 - z^{-1}) = \sum_{m=0}^{L2} z^{-m},$$

which means y(m)=x(m)+x(m−1)+. . . +x(m−L2) if the input signal of the MAV means 40 is defined as x(m) and its output signal is defined as y(m).

In the example of FIG. 6 and also the examples of FIGS. 7 and 8, the correlation delay value L1 is L1=S/M. The moving average value L2 is L2≦S/M, so that a signal fed to the moving average means 40 is delayed over L2≦S/M samples. In both cases, S is the total number of samples in one OFDM-timeburst. In the example shown in FIGS. 3, S=32 and M=4, so that L1=8 and L2≦8. The best performance is achieved if L2 is close to S/M, in the example of FIG. 3 this means L2 should be close to 8 samples (e. g. 6, 7 or 8 samples).

In the correlation means 28, 29, 30, 31 and the moving average means 40, correlation in the time domain to obtain time synchronization information for further processing of the incoming signals is performed. The output of the moving average means 40 is then fed to an absolute value means 45. The output of the absolute value means 45 is fed to a peak detection means 46, which identifies the best correlation result for an optimum estimate of the window position of the discrete Fourier transformation in the discrete Fourier transformation means 23. In an ideal transmission case, the imaginary part of the correlated signal is zero. In the case of a frequency offset in the transmitted signal, the imaginary part of the correlated signal is not zero, so that a frequency offset detection has to be performed in a frequency offset detection means 47. Conventionally, if all subcarriers are modulated, the frequency offset detection range is limited to $-f_0/2 \ldots +f_0 2$, whereby $f_0$ is the subcarrier spacing. According to the present invention, the frequency offset detection range in the frequency offset detection means 47 is extended to $M\times(-f_0/2) \ldots M\times(+f_0/2)$, wherein $f_0$ is the subcarrier spacing. Therefore, the frequency offset detection range is advantageously extended according to the present invention. The output of the frequency offset detection means 47 and the peak detection means 46 are used for time-/frequency synchronization in the succeeding discrete Fourier transformation means 23.

In a case, in which only subcarriers with odd indices are modulated, an additional absolute block means (or sign inverter) can be used in the receiving apparatus to achieve a positive correlation result. This additional absolute block means can, for example, be provided between the last correlation part and the moving average means 40. In order to achieve time synchronisation only this block is not necessary, because the absolute value means 45 in FIG. 5 already provides positive results. However, to achieve a correct frequency detection (synchronisation), this additional absolute block means is required.

In FIG. 7, a time-/frequency synchronization means 22 is shown for M=2. In this case, the correlations means consists only of one correlator part 28. The correlation delay value L2 is S/2 and the moving average parameter L2 is smaller or equal S/2, whereby the best performance is achieved if L2 is close to S/2.

In FIG. 8, a time-/frequency synchronization means 22 is shown for M=4. In this case, L1=S/4 and L2≦S/4.

In FIG. 9, the frequency offset detection means 47 shown in FIGS. 6, 7 and 8 is shown in more detail. As stated above, the frequency offset detection range is advantageously extended according to the present invention. The structure of the frequency offset detection means 47 shown in FIG. 9 provides this extended frequency offset detection range.

The frequency offset is $\Delta f = M\times f_0\times(\frac{1}{2}\pi)\times\arctan(q/i)$, wherein M is the number of the repeated wave forms in one OFDM time burst, $f_0$ the subcarrier spacing, "i" the in-phase part and "q" the quadrature part of the complex output of the MAV means 40. As shown in FIG. 9, the frequency offset detection means 47 comprises a split means 48, a calculation means 49 and a multiplier 50. In the split means 48, the complex output of the MAV means 40 is separated in an "in" and a "quad" component, when the split means 48 receives a peak detection signal from the peak detection means 46. The peak detection means produces a peak detection signal every time it detects a peak. The "in" and "quad" component from the split means 48 are then fed to the calculation means 49. The calculation means 49 calculates the mathematical expression of $(\frac{1}{2}\pi)\times\arctan(q/i)$, which can be done in a look-up table (hardware implementation) or calculated in a processor. The calculation result from the calculation means 49 is supplied to the multiplier 50. The multiplier 50 multiplies the calculation result from the calculating means 49 with M(number of repeated wave forms in one OFDM time burst). The result of the multiplication in the multiplier 50 is the frequency offset Δf as a fraction of the subcarrier spacing $f_0$ (result=$\Delta f/f_0$). The detected frequency offset is used in the synchronisation unit 22 of the receiving apparatus to obtain the frequency synchronisation.

In FIG. 10, a frequency spectrum of a conventionally correlated signal (cyclic extension) is shown and compared with a frequency spectrum shown in FIG. 11 for a signal correlated according to the present invention. The parameter for the example shown in FIG. 10 has been calculated for a RACH-burst. Its parameters are: signal to noise ratio: 6,0 dB, frequency offset: $-0{,}30001\times f_0$, guard samples per burst: 16, RACH-scheme: 4, number of RACH-slots: 4, discrete Fourier transformation size (=number of subcarriers or number of OFDM-burst samples): 128 and used subcarriers per slot: 96.

As can be seen, the present invention provides for very good peak detection compared to the conventional correlation. The four bursts in the signal stream can be clearly identified. The detected frequency offset values are: 0,3004; 0,3081, 0,3117 and 0,3151 which is very accurate (error<5%).

What is claimed is:

1. Transmission method for transmitting OFDM-signals, comprising the steps of modulating said signals onto a plurality of subcarriers using a OFDM-modulation method, transforming said modulated signals into the time domain, and transmitting said signals characterized in that in said modulating step every M-th subcarrier is modulated with a signal, wherein M is an integer and M≧2.

2. Transmission method according to claim 1, characterized in, that the not modulated subcarriers are set to zero.

3. Transmission method according to claim 1, characterized in, that M=2 and only subcarriers with even indices are modulated.

4. Transmission method according to claim 1, characterized in, that said modulation step comprises the steps of generating integer values form 0 to L−1, wherein L is the number of available subcarriers, and modulating every M-th signal onto said subcarriers on the basis of said integer values.

5. Transmission method according to claim 1, wherein:

said modulating step includes providing a switch control signal to a switch having a first input and a second input, wherein the first input receives a signal to be modulated onto a subcarrier and the second input receives a zero value signal.

6. Transmission apparatus for transmitting OFDM-signals, comprising:

modulation means (4) for modulating said signals onto a plurality of subcarriers using a OFDM-modulation method, transformation means (5) for transforming said modulated signals into the time domain, and transmission means for transmitting said signals characterized in that in said modulation means every M-th subcarrier is modulated, wherein M is an integer and M≧2.

7. Transmission apparatus according to claim 6, characterized in, that in said modulation means (4) the not modulated subcarriers are set to zero.

8. Transmission apparatus according to claim 6, characterized in, that in said modulation means (4) M=2 and only subcarriers with even indices are modulated.

9. Transmission apparatus according to claim 6, characterized in that said modulation means (4) comprises means (10) for generating integer values from 0 to L−1, wherein L is the number of available subcarriers, whereby said modulation means (4) modulates every M-th signal onto said subcarriers on the basis of said integer values.

10. Transmission-apparatus according to claim 6, wherein:

said modulation means includes a switch having a first input and a second input, wherein the first input receives a signal to be modulated onto a subcarrier and the second input receives a zero value signal.

11. Receiving method for receiving OFDM-signals comprising M identical or respectively mirrored wave forms within one OFDM-timeburst, wherein M is an integer and M≧2, comprising the steps of receiving said OFDM-signals, correlating said waveforms to obtain time synchronization using M−1 correlators, transforming said signals into the frequency domain, and demodulating said signals.

12. Receiving method according to claim 11, characterized in, that in said correlation step said wave form parts are correlated on the basis of a delay value L1=S/M samples and averaged over L2≦S/M samples, whereby S is the total number of samples in one OFDM-timeburst.

13. Receiving method according to claim 11, characterized in, that after said correlation step a peak detection step is carried out to provide time synchronization for said transformation of said signals into the frequency domain.

14. Receiving method according to claim 11, characterized in, that after said correlation step a frequency offset detection step is carried out to provide frequency synchronization for said transformation of said signals into the frequency domain.

15. Receiving apparatus for receiving OFDM-signals comprising M identical or respectively mirrored wave forms within one OFDM-timeburst, wherein M is an integer and M≧2, comprising:

receiving means for receiving said OFDM-signals, correlating means (28, 29, 30, 31) correlating said waveforms to obtain time synchronization, wherein said correlation means includes M−1 correlators, synchronization, transformation means for transforming said signals into the frequency domain, and demodulating said signals.

16. Receiving apparatus according to claim 15, characterized in, that in said correlation means (28, 29, 30, 31) said identical wave forms are correlated on the basis of a delay value L1=S/M and averaged over L2≦S/M samples, whereby S is the total number of samples in one OFDM-timeburst.

17. Receiving apparatus according to claim 15, characterized in, that after said correlation means (28, 29, 30, 31) a peak detection means (46) is provided for providing time synchronization for said transformation of said signals into the frequency domain.

18. Receiving apparatus according to claim 15, characterized in, that after said correlation means (28, 29, 30, 31) a frequency offset detection means (47) is provided for providing frequency synchronization for said transformation of said signals into the frequency domain.

19. Transmission system for transmitting OFDM-signals, comprising:

a transmission apparatus including modulation means for modulating said signals onto a plurality of subcarriers by OFDM-modulation, transformation means for transforming said modulated signals into the time domain, and transmission means for transmitting said signals characterized in that in said modulation means every M-th subcarrier is modulated, wherein M is an integer greater than or equal to 2; and a receiving apparatus for receiving said OFDM-signals having M identical or respectively mirrored waveforms within one OFDM-timeburst, including receiving means for receiving said OFDM-signals, correlation means for correlating said waveforms to obtain time synchronization, transformation means for transforming said signals into the frequency domain, and demodulation means for demodulating said transformed signals.

*20. A method of transmitting predetermined values on a subset of OFDM subcarriers, comprising steps of:*

*associating a first subset of a sequence of N subcarriers with the predetermined values, and associating a second subset of the sequence of N subcarriers with a 0 value;*

*respectively modulating said first subset of N subcarriers with the predetermined values, and not modulating the second subset of the sequence of N subcarriers so as to form a modulated subcarrier sequence with modulated separated by unmodulated subcarriers;*

*transforming said modulated subcarrier sequence into a time domain to create a time domain waveform, and*

*transmitting said time domain waveform, wherein*

*a repeating pattern of said modulated subcarrier sequence includes a subcarrier from the first subset followed by 3 unmodulated subcarriers from the second subset of N subcarriers, and*

*said repeating pattern continues for at least 5 cycles, including at least 5 subcarriers from said first subset and 15 subcarriers from said second subset.*

*21. The method of claim 20, wherein:*

*said repeating pattern continues for at least 6 cycles, including at least 6 subcarriers from said first subset and 18 subcarriers from said second subset.*

*22. The method of claim 20, wherein:*

*said predetermined values are non-zero, and have a common magnitude.*

*23. The method of claim 20, wherein:*

*said time domain waveform includes 4 substantially identical or mirrored waveforms within one OFDM timeburst.*

*24. The method of claim 20, wherein said information includes synchronization information.*

*25. A method of transmitting predetermined values on a subset of OFDM subcarriers, comprising steps of:*

*associating a first subset of a sequence of N subcarriers with the predetermined values, and associating a second subset of the sequence of N subcarriers with a 0 value;*

*modulating said first subset of N subcarriers with the predetermined values, and not modulating the second subset of the sequence of N subcarriers so as to create a modulated subcarrier sequence;*

*time domain transforming said modulated subcarrier sequence to create a time domain waveform, and*

*transmitting said time domain waveform, wherein*

*respective of said N subcarriers are separated by 3 unmodulated subcarriers from the second subset of N subcarriers in a repeating pattern, the repeating pattern including one of the N subcarriers followed sequentially by 3 of the second subset of subcarriers, and*

*said repeating pattern continues for at least 5 cycles such that the modulated subcarrier sequence includes at least 5 subcarriers from said first subset and 15 subcarriers from said second subset.*

*26. The method of claim 25, wherein:*

*said repeating pattern continues for at least 6 cycles, including at least 6 subcarriers from said first subset and 18 subcarriers from said second subset.*

*27. The method of claim 25, wherein:*

*said predetermined values are non-zero, and have a common magnitude.*

*28. The method of claim 25, wherein:*

*said time domain waveform includes 4 substantially identical or mirrored waveforms within one OFDM time-burst.*

*29. The method of claim 25, wherein said information includes synchronization information.*

*30. A transmission method for transmitting information from an OFDM transmitter, comprising the steps of:*

*modulating said information onto a plurality of OFDM subcarriers;*

*transforming said modulated information into the time domain; and*

*transmitting said information, wherein*

*said modulating step includes modulating a first subcarrier with a first value of said information, but not modulating M−1 successive subcarriers, followed by modulating a second subcarrier with a second value of said information, but not modulating M−1 successive subcarriers,*

*M being an integer that is 2 or larger.*

*31. Transmission method for transmitting OFDM synchronization signals, comprising the steps of*

*modulating synchronization values onto a subcarrier sequence using a OFDM-modulation method,*

*transforming said modulated subcarrier sequence into the time domain in order to obtain a time domain OFDM synchronization signal, and*

*transmitting said time domain OFDM synchronization signal,*

*wherein in said modulating step every M-th subcarrier is modulated with said synchronization values, M being an integer and M≧2.*

*32. Transmission method for transmitting OFDM synchronization signals, comprising the steps of*

*modulating synchronization values onto subcarriers a subcarrier sequence using a OFDM-modulation method, said subcarrier sequence comprising at least a first and a second subset of subcarriers, wherein every M-th subcarrier of said first subset is modulated with said synchronization values, M being an integer and M≧2, and subcarriers in between modulated subcarriers of said first subset are unmodulated,*

*transforming said subcarrier sequence into the time domain in order to obtain a time domain synchronization signal, and*

*transmitting said time domain synchronization signal.*

*33. Transmission method according to claim 32, wherein at least 5 subcarriers of said first subset are modulated with synchronization information, and 3 consecutive subcarriers in between said modulated subcarriers remain unmodulated, and wherein said second subset comprises at least 3 consecutive subcarriers.*

*34. Transmission method for transmitting OFDM-signals and synchronization signals, comprising the steps of:*

*modulating said OFDM signals onto a plurality of available subcarriers using an OFDM-modulation method,*

*transforming said modulated signals into the time domain, and*

*transmitting said transformed signals;*

*wherein in said modulating step said synchronization signals are modulated on every 4th subcarrier of said plurality of available subcarriers and the other subcarriers of said plurality of available subcarriers are not modulated.*

*35. Transmission method for transmitting OFDM synchronization signals by using an OFDM transmission scheme, comprising the steps of:*

*modulating said OFDM synchronization signals onto every 4th subcarrier of a plurality of available subcarriers being assigned to the OFDM transmission scheme in the frequency domain;*

*transforming a frequency domain sequence of said modulated synchronization signals into the time domain to generate a time domain sequence, and*

*transmitting said time domain sequence.*

*36. Transmission method for transmitting OFDM data and synchronization signals, comprising the steps of:*

*modulating said OFDM data onto a plurality of subcarriers using an OFDM-modulation method, wherein said synchronization signals are modulated on every M-th subcarrier of said plurality of subcarriers in the frequency domain so as to generate a frequency domain sequence comprising modulated and un-modulated subcarriers, wherein M is an integer and M≧2;*

*generating a frequency domain representation comprising said frequency domain sequence and zero amplitude sequences being arranged at the front and end of said frequency domain sequence;*

*transforming said frequency domain representation into a time domain representation by using Inverse Discrete Fourier Transformation, wherein the number of samples of said time domain representation is equal to the sum of the number of symbols of said frequency domain sequence and the number of symbols of said zero amplitude sequences; and*

*transmitting said time domain representation.*

*37. Transmission method for transmitting OFDM synchronization signals by using OFDM transmission scheme, comprising the steps of:*

*generating a frequency domain sequence by modulating said OFDM synchronization signals on every M-th subcarrier of a plurality of subcarriers used in said OFDM transmission scheme, wherein M is an integer and M≧2, and wherein said frequency domain sequence comprises modulated subcarriers having nonzero values and unmodulated subcarriers having a zero value;*

*providing a frequency domain representation comprising said frequency domain sequence and second frequency domain sequences having zero amplitude symbols, wherein said second frequency domain sequences are arranged at the front and end of said frequency domain sequence;*

*transforming said frequency domain representation into a time domain representation by using Inverse Discrete Fourier Transformation, wherein the number of samples of said time domain representation is equal to the total number of symbols in said frequency domain sequence and second frequency domain sequences; and*

*transmitting said time domain representation.*

*38. Transmission method for transmitting OFDM data and synchronization signals, comprising the steps of:*

*modulating said OFDM data onto a plurality of subcarriers using an OFDM-modulation method, wherein said synchronization signals are modulated on every M-th subcarrier of said plurality of subcarriers in the frequency domain so as to generate a frequency domain sequence wherein M is an integer and M≧2;*

*transforming said frequency domain sequence into a time domain sequence by using Inverse Discrete Fourier Transformation,*

*cyclically extending said time domain sequence in time domain so that the length of the extended time domain sequence is longer than the one OFDM timeburst period; and*

*transmitting said extended time domain sequence.*

*39. Transmission method for transmitting OFDM synchronization signals by using an OFDM transmission scheme, comprising the steps of:*

*generating a frequency domain sequence by modulating said OFDM synchronization signals on every M-th subcarrier of a plurality of subcarriers used in said OFDM transmission scheme, wherein M is an integer and M≧2;*

*transforming said frequency domain sequence into a time domain sequence by using Inverse Discrete Fourier Transformation,*

*cyclically extending said time domain sequence in time domain so that the number of samples of the extended time domain sequence is larger than the number of samples of said time domain sequence; and*

*transmitting said extended time domain sequence.*

*40. Transmission method for transmitting OFDM data and synchronization signals, comprising the steps of:*

*modulating said OFDM data onto a plurality of subcarriers using an OFDM-modulation method, wherein said synchronization signals are modulated on every M-th subcarrier of said plurality of subcarriers in the frequency domain so as to generate a frequency domain sequence, wherein M is an integer and M≧2;*

*transforming said frequency domain sequence into a time domain sequence by using a scheme of Inverse Discrete Fourier Transformation so that said time domain sequence comprises IN-phase M-th identical waveforms and QUAD-phase M-th identical waveforms, wherein each of said QUAD-phase waveforms is different from the corresponding each of said IN-phase waveforms in the time domain; and*

*transmitting said time domain sequence.*

*41. Transmission method for transmitting OFDM synchronization signals by using OFDM transmission scheme, comprising the steps of:*

*generating a frequency domain sequence by modulating said OFDM synchronization signals on every M-th subcarrier of a plurality of subcarriers used in said OFDM transmission scheme, wherein M is an integer and M≧2;*

*transforming said frequency domain sequence into a time domain sequence by using a scheme of Inverse Discrete Fourier Transformation so that said time domain sequence comprises IN-phase M-th identical waveforms and QUAD-phase M-th identical waveforms, wherein each of said QUAD-phase waveforms is different from the corresponding each of said IN-phase waveforms in the time domain; and*

*transmitting said time domain sequence.*

*42. Transmission method for transmitting OFDM data and synchronization signals, comprising the steps of:*

*modulating said OFDM data onto a plurality of subcarriers using an OFDM-modulation method, wherein said synchronization signals are modulated on every M-th subcarrier of said plurality of subcarriers in the frequency domain so as to generate a frequency domain sequence, wherein M is an integer and M≧2;*

*transforming said frequency domain sequence into a time domain sequence by using a scheme of Inverse Discrete Fourier Transformation so that said time domain sequence comprises M-th identical waveforms, wherein each of said M-th identical waveforms is correlated in the receiver device to detect the synchronization timing information; and*

*transmitting said time domain sequence.*

*43. A transmission method for transmitting OFDM signals from an OFDM transmitter, the method comprising:*

*modulating said OFDM signals onto a first plurality of subcarriers using an OFDM modulation method, wherein every $4^{th}$ subcarrier of a second plurality of subcarriers corresponds to the first plurality of subcarriers;*

*transforming said first plurality of modulated subcarriers into the time domain, and*

*transmitting said time domain transformed modulated subcarriers.*

*44. The transmission method according to claim 43, wherein subcarriers of said second plurality of subcarriers that do not correspond to said first plurality of subcarriers are not modulated.*

*45. A transmission apparatus configured to transmit OFDM signals, the transmission apparatus comprising:*

*a modulation unit configured to modulate said OFDM signals onto a first plurality of subcarriers using an OFDM modulation method, wherein every $4^{th}$ subcarrier of a second plurality of subcarriers corresponds to the first plurality of subcarriers;*

*an inverse discrete Fourier transform unit configured to transform said first plurality of modulated subcarriers into the time domain; and*

*a transmitter configured to transmit said time domain transformed modulated subcarriers.*

*46. The transmission apparatus according to claim 45, wherein subcarriers of said second plurality of subcarriers that do not correspond to said first plurality of subcarriers are not modulated.*

* * * * *